J. COULSON.
ELECTROLYTE.
APPLICATION FILED FEB. 19, 1917.
1,412,514.
Patented Apr. 11, 1922.
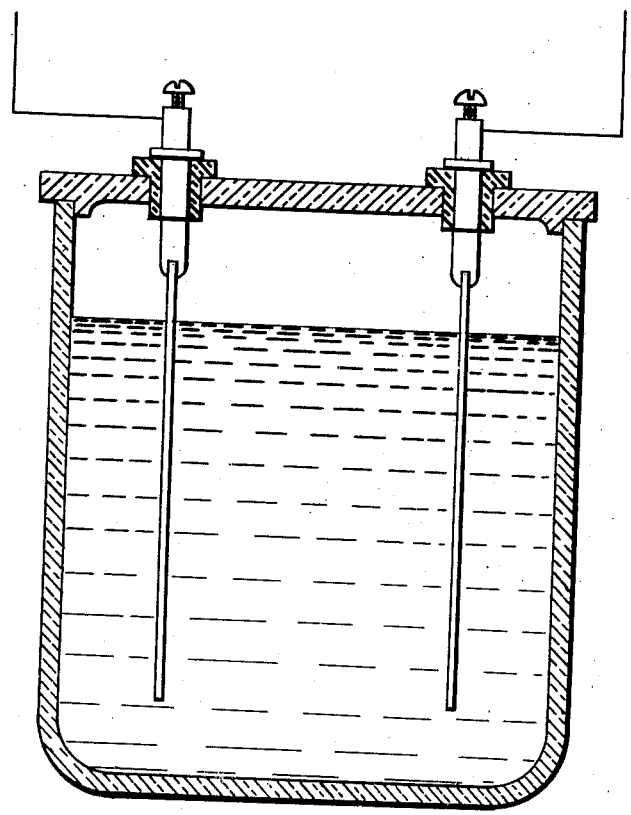
1 to 2 % Solution of Malic
Acid and Ammonium Borate
INVENTOR
John Coulson

UNITED STATES PATENT OFFICE.

JOHN COULSON, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTROLYTE.

1,412,514.  Specification of Letters Patent.  Patented Apr. 11, 1922.

Application filed February 19, 1917. Serial No. 149,532.

*To all whom it may concern:*

Be it known that I, JOHN COULSON, a subject of the King of Great Britain, and a resident of Wilkinsburg, in the county of Allegheny and State of Pennsylvania, have invented a new and useful Improvement in Electrolytes, of which the following is a specification.

My invention relates to electrolytes for use in electrolytic cells, such as lightning arresters, condensers and rectifiers, and it has for its object to provide an electrolyte which shall be capable of acting upon film-forming metals, such as aluminum, magnesium and the like, to produce dielectric films of great endurance when subjected to relatively high potentials for long periods of time, and to produce active plates of high electric capacity.

A considerable number of soluble substances have heretofore been employed in electrolytes for cells of the above-indicated character. Such electrolytes are valuable in proportion as they enable the plates of the cells to be continuously subjected to high potentials and also in proportion to the power losses in the cells and to the capacity of the plates, these factors of operating voltage, power losses and capacity being different with different electrolytes. The electrical characteristics of the cells are also dependent upon the concentration of the electrolytes, which should be chosen with due regard to the conditions under which the cells are to be operated.

I have discovered that electrolytes containing malic acid and salts of malic acid, preferably in the presence of ammonia or other weak bases, produce films upon film-forming metals which have great durability under high operating voltages, with lower power factor losses. A solution of ammonium malate and solutions of malic acid containing ammonium borate give excellent results.

An electrolyte containing 1% to 2% of ammonium malate in aqueous solution, when employed with aluminum condenser plates, will continuously withstand voltages of the order of 375 volts for indefinite periods of time, with a power-factor loss which remains substantially constant at about 13%. The critical or break-down voltage is above 375 volts. The capacity of the plates immersed in this electrolyte is about 1/20 microfarad per square centimeter for untreated aluminum and about 1/10 microfarad per square centimeter for plates which are given a preliminary treatment with acid according to the process described and claimed in my co-pending application for Letters Patent, Serial No. 54,590, filed October 7, 1915.

Another effective electrolyte containing malic acid radicals is composed of malic acid and ammonium borate, one suitable composition of such an electrolyte consisting of an aqueous solution containing about 0.5% of malic acid and about 0.4% of ammonium borate. This electrolyte produces the same desirable characteristics as the ammonium malate electrolyte described above, the critical or break-down voltage being even higher.

In the accompanying drawing constituting a part hereof, the single figure is a cross-sectional view of a condenser containing an electrolyte made in accordance with this invention.

In general, electrolytes containing malic acid should be dilute, as is the case with most electrolytes containing organic acid radicals, on account of the better electrical characteristics produced at low concentrations and also because fungi may form upon the plates if the electrolytes are concentrated, thereby causing the films to break down.

The electrolytes which I have described herein may be used for initially forming films upon plates used in electrolytic cells or for the continuous operation of such cells, or both. It is to be understood that the specific substances and operating conditions which I have mentioned herein are intended to be merely illustrative of my invention and not as imposing limitations thereon, the scope of my invention being set forth in the appended claims.

I claim as my invention:

1. An electrolyte for electrolytic condensers, lightning arresters, rectifiers and the like comprising an aqueous solution of ammonium malate.

2. An electrolyte for electrolytic condensers, lightning arresters, rectifiers and the like comprising an aqueous solution containing less than 2% of ammonium malate.

3. An electrolyte for electrolytic condensers, lightning arresters, rectifiers and the like comprising an aqueous solution containing malic acid and ammonium borate.

4. An electrolyte for electrolytic condensers, lightning arresters, rectifiers and the like comprising an aqueous solution containing substantially 1 to 2% of dissolved material, such dissolved material comprising malic acid and ammonium borate.

In testimony whereof, I have hereunto subscribed my name this 31st day of January, 1917.

JOHN COULSON.